US005761297A

United States Patent [19]

Kingsbury et al.

[11] Patent Number: 5,761,297
[45] Date of Patent: Jun. 2, 1998

[54] INTERCONNECTION MECHANISM FOR A TILTABLE TELEPHONE DISPLAY UNIT

[75] Inventors: Mary E. Kingsbury, Addison; Wayne E. McKinnon, Georgetown; Charles Elbert Sparks, Jr., Pflugerville, all of Tex.

[73] Assignee: Siemens Business Communication Systems, Inc., Santa Clara, Calif.

[21] Appl. No.: 852,878

[22] Filed: May 8, 1997

Related U.S. Application Data

[63] Continuation of Ser. No. 408,047, Mar. 21, 1995, abandoned.

[51] Int. Cl.[6] .................................................. H04M 1/00
[52] U.S. Cl. ................................. 379/428; 379/436
[58] Field of Search ............................. 379/435, 436, 379/428, 429, 420, 447

[56] References Cited

U.S. PATENT DOCUMENTS 5,187,743  2/1993  Gumb et al. ........................... 379/435
5,416,838  5/1995  Liebing et al. ........................ 379/428

FOREIGN PATENT DOCUMENTS

2690587  10/1993  France ............................. 379/428
3900996 C1  11/1989  Germany.
661 396 A5  12/1984  Switzerland.

Primary Examiner—Jack Chiang

[57]  ABSTRACT

The interconnection mechanism preferably attaches a display unit to the cover of a telephone in a manner that allows the display unit to be rotated relative to the telephone. The interconnection mechanism includes a rotation edge on the telephone cover that engages with a rotation notch on the display unit to define an axis of rotation. The mechanism also includes a cantilever beam on the telephone that applies a force against a curved surface of the display unit. The cantilever beam presses the rotation notch of the display unit against the rotation edge of the cover. The force from the cantilever beam also provides a slight, uniform resistance against the rotation of the display unit. The display unit also includes a pair of snaps that engage with a pair of curved surfaces on the cover to lock the display unit into the cover.

24 Claims, 5 Drawing Sheets

FIG. 7

INTERCONNECTION MECHANISM FOR A TILTABLE TELEPHONE DISPLAY UNIT

CROSS-REFERENCE TO RELATED APPLICATION

This application is a continuation of Ser. No. 08/408.047 filed Mar. 21, 1995 now abandoned.

Technical Field of the Invention

The present invention relates to a mechanism for interconnecting a display unit and a telephone in a manner that allows the display unit to be rotated or otherwise moved relative to the telephone.

BACKGROUND OF THE INVENTION

Most modern telephones comprise the same general types of components or units. First, telephones typically include a printed circuit board (PCB) containing various electronic components and connectors for implementing most of the electronic functions of the telephone. The PCB is typically enclosed within a housing comprising a base or bottom component and a cover or top component. Of course, most telephones also have a handset and a dialpad.

Some prior art telephones have included a liquid crystal display (LCD) or other display to provide information to the user of the telephone. For example, the display can indicate the telephone number from which an incoming call originated, the current date and time, and other useful information. Some prior art telephones provide a display that can be moved between different positions. For example, a tiltable display can typically be rotated about a rotation axis into any of various possible positions. Movable displays allow a user to select a position for the display that is most comfortable or effective for the user.

Prior art telephones utilize various types of mechanisms for mounting a tiltable display to the telephone. Some prior art mechanisms utilize both the cover of the telephone and the base of the telephone to secure the display unit, while other mechanisms utilize the cover, along with separate components that are also mounted to the cover. Some prior art mechanisms utilize one or more rotating pins to establish an axis of rotation, others utilize pegs traveling within a curved groove, and still others utilize ball bearings or springs. As described in greater detail, the present invention achieves several advantages over the prior art mechanisms.

SUMMARY OF THE INVENTION

One embodiment of the interconnection mechanism of the present invention connects a display unit to a telephone in a manner that allows the display unit to be rotated relative to the telephone. The interconnection mechanism comprises a rotation edge, a rotation notch, a cantilever beam, a curved friction surface, a snap and a curved surface. A first one of the rotation edge and the rotation notch is located in the telephone. A second one of the rotation edge and the rotation notch is located in the display unit. The rotation edge engages with the rotation notch to define an axis of rotation for the display unit. The rotation edge applies a first force against the rotation notch. The rotation notch applies a second force against the rotation edge. A first one of the cantilever beam and the curved friction surface is located in the telephone. A second one of the cantilever beam and the curved friction surface is located in the display unit. The cantilever beam applies a third force against the curved friction surface. The curved friction surface applies a fourth force against the cantilever beam. A first one of the snap and the curved surface is located in the telephone. A second one of the snap and the curved surface is located in the display unit. The snap engages with the curved surface to secure the display unit within the telephone. The snap applies a fifth force against the curved surface. The curved surface applies a sixth force against the snap. The first force, the second force, the third force, the fourth force, the fifth force and the sixth force enable the display unit to be rotated relative to the telephone.

DETAILED DESCRIPTION

Figure 1:
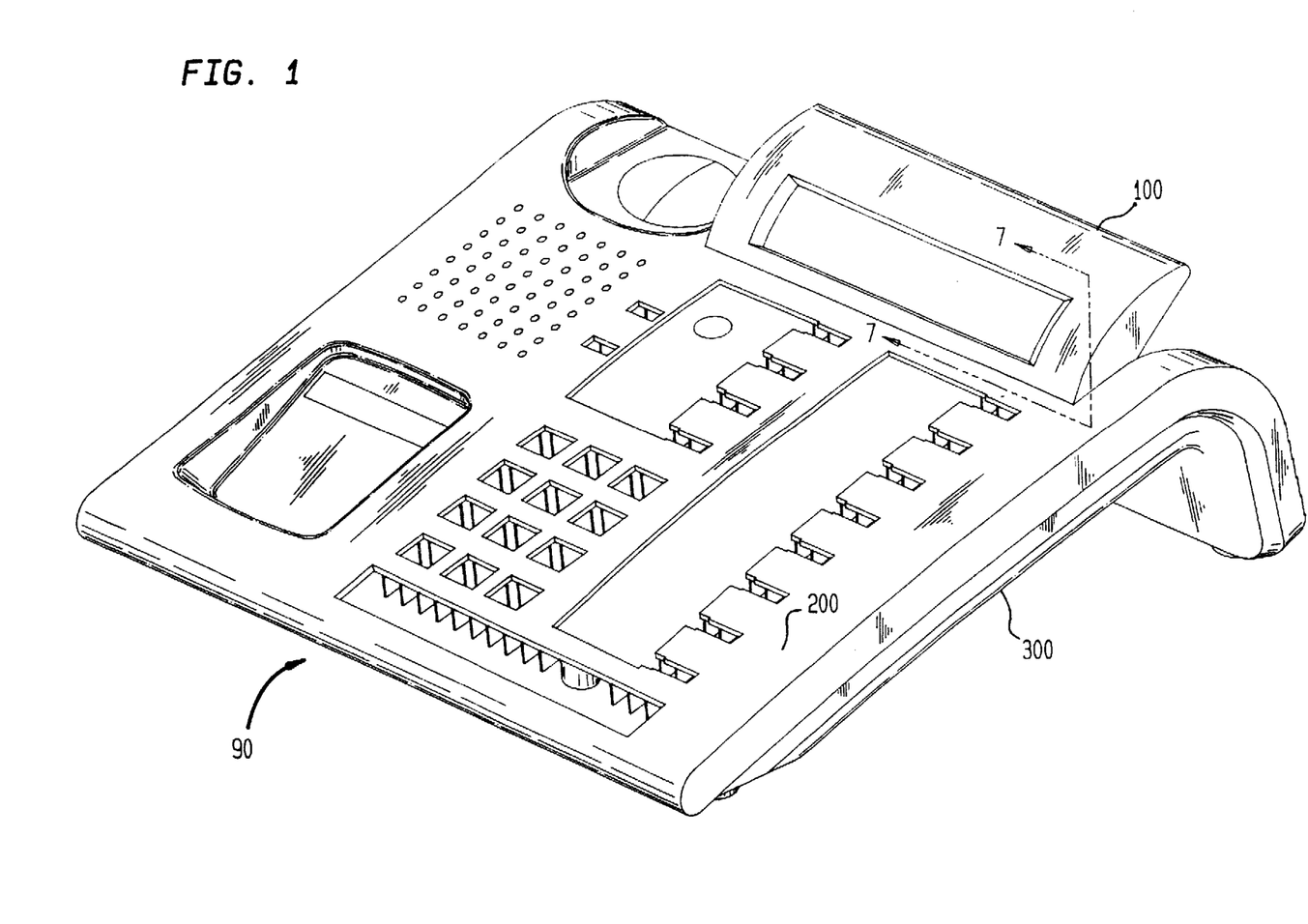
FIG. 1 is a perspective view of a telephone having an LCD display, where the display is attached to a cover of the telephone by a preferred embodiment interconnection mechanism of the present invention.

FIG. 1 is a perspective view of a telephone 90 having an LCD display unit 100. The telephone 90 also comprises a telephone cover 200 and a telephone base 300. Although not shown in FIG. 1, the telephone 90 also comprises a handset, a dialpad, a plurality of function keys and a plurality of light emitting diodes (LED's). The display unit 100 is attached to the telephone cover 200 by a preferred embodiment interconnection mechanism of the present invention. The interconnection mechanism allows the display unit 100 to be rotated relative to the cover 200. In FIG. 1, the display unit 100 is illustrated in a partially rotated position. The display unit 100 can be pushed down toward the base 300 of the telephone 90, or it can be pulled forward away from the base 300.

Figure 2:
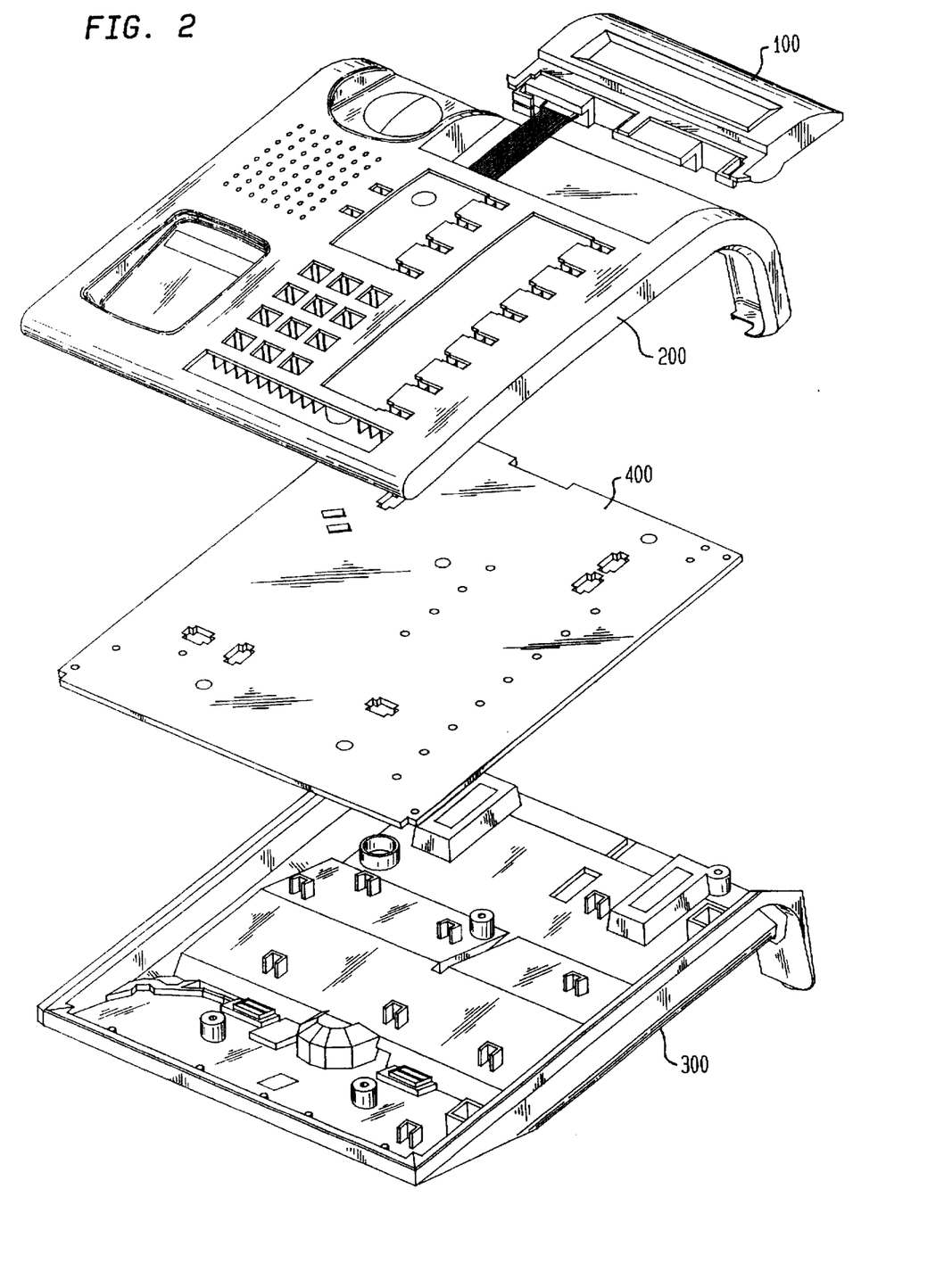
FIG. 2 is an exploded view of the telephone of FIG. 1.

FIG. 2 is an exploded view of the telephone 90. FIG. 2 shows a printed circuit board (PCB) 400, along with the display unit 100, the telephone cover 200 and the telephone base 300 of FIG. 1.

Figure 3:
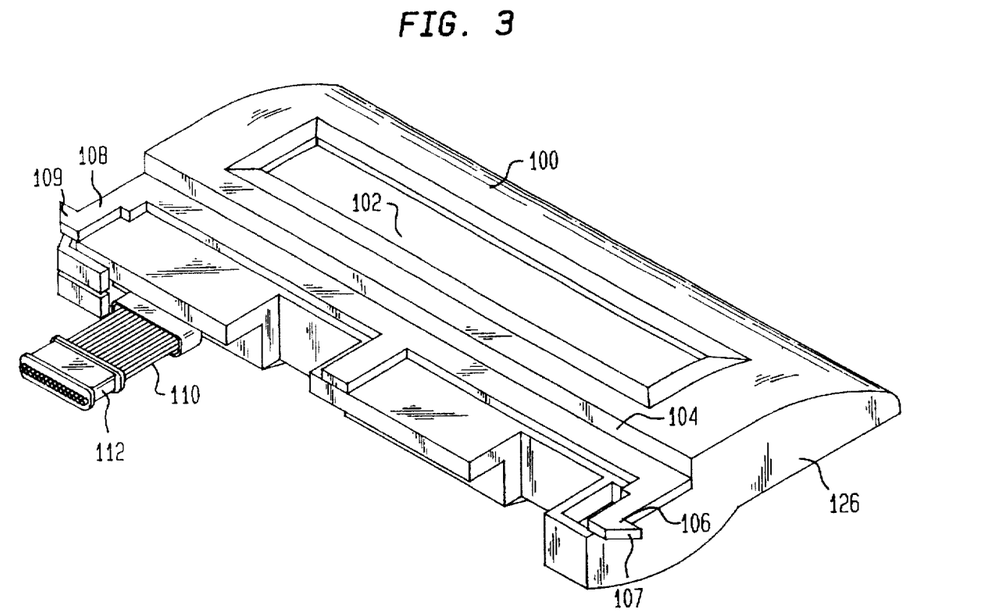
FIG. 3 is a top perspective view of the display unit of FIG. 1, illustrating connection structures of the preferred embodiment interconnection mechanism.

FIG. 3 is a top perspective view of the display unit 100. FIG. 3 shows an LCD display 102, a rotation notch 104, a right snap 106, a left snap 108, a cable 110, a connector 112 and a display right side wall 126. The rotation notch 104 forms substantially a ninety degree angle and extends substantially across the width of the display unit 100. The right snap 106 and the left snap 108 also form substantially ninety degree angles. The right snap 106 has a right snap hook 107 that extends to the right in FIG. 3, while the left snap 108 has a left snap hook 109 that extends to the left in FIG. 3. The cable 110 is connected at a first end (not shown) within the display unit 100 and at a second end to the connector 112. The connector 112 is connected to a second connector (not shown) on the underside of the PCB 400 when the telephone 90 is assembled. Thus, the cable 110, the connector 112 and the second connector provide an electronic connection between the PCB 400 and the display unit 100, which provides power and data signals to the display unit 100.

Figure 4:
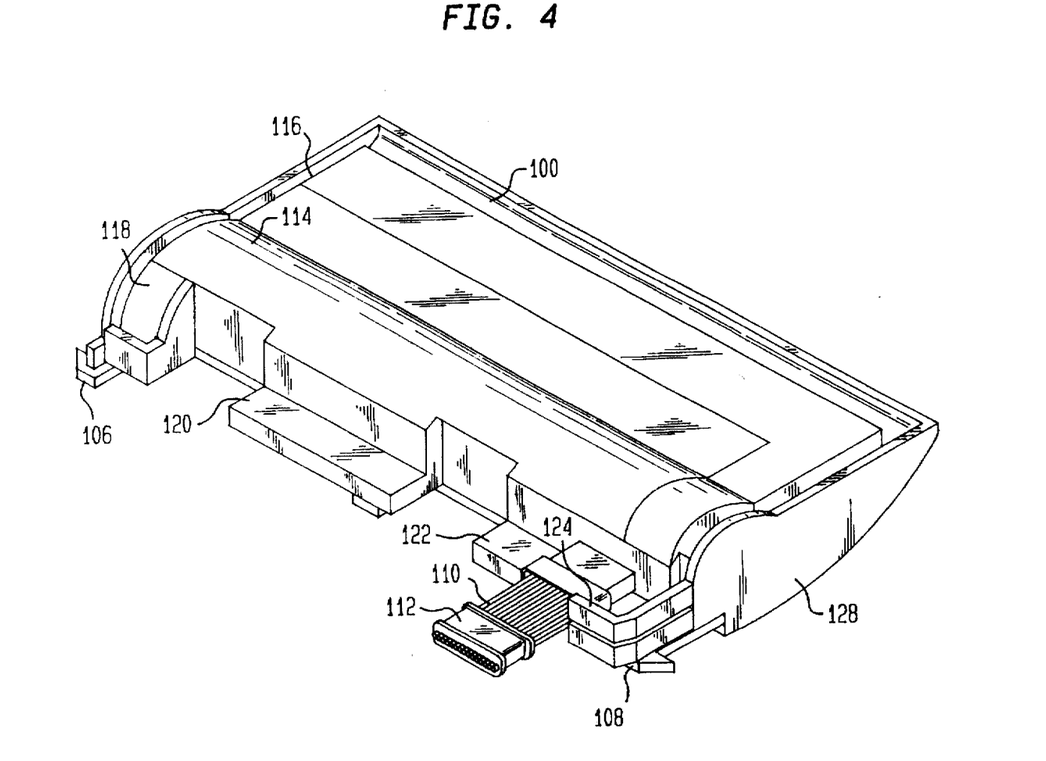
FIG. 4 is a bottom perspective view of the display unit of FIG. 1, illustrating additional connection structures of the preferred embodiment interconnection mechanism.

FIG. 4 is a bottom perspective view of the display unit 100. FIG. 4 shows the right snap 106, the left snap 108, the cable 110, the connector 112, a curved friction surface 114, a bottom surface 116, a display left side wall 128, an outside right rotation stop 118, an inside right rotation stop 120, an inside left rotation stop 122 and an outside left rotation stop 124. The curved friction surface 114 forms a substantially constant radius arc substantially about the rotation notch 104. The curved friction surface 114 also extends substantially across the width of the display unit 100. The rotation stops 118, 120, 122 and 124 extend in a substantially perpendicular direction away from the curved friction surface 114.

Figure 5:
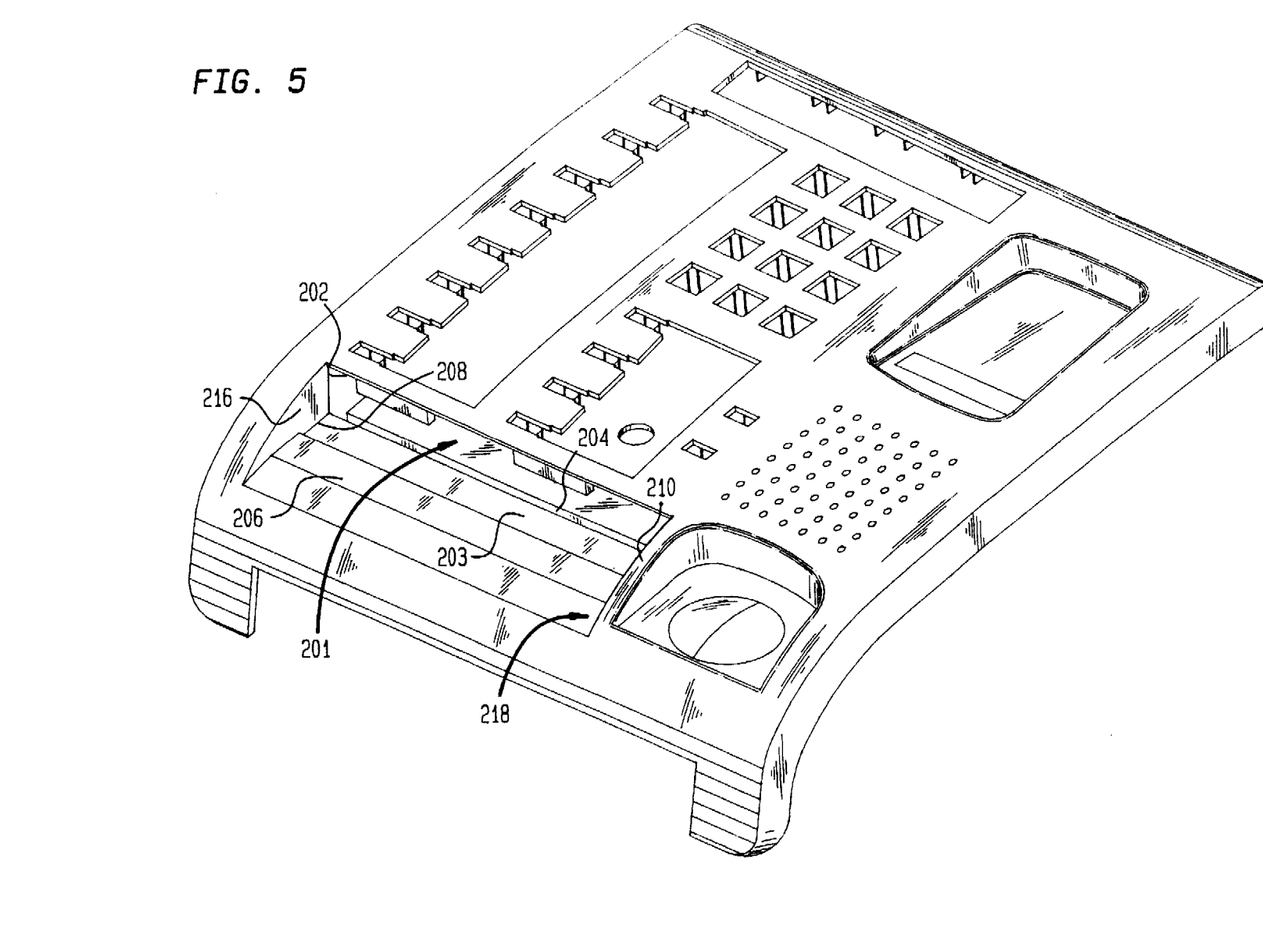
FIG. 5 is a perspective view of the telephone cover of FIG. 1, illustrating additional connection structures of the preferred embodiment interconnection mechanism.

FIG. 5 is a perspective view of the telephone cover 200. As shown in FIG. 5, the telephone cover 200 defines an opening 201 into which the display unit 100 is secured when the display unit 100 is assembled together with the telephone 90. FIG. 5 also shows a rotation edge 202, a cantilever beam 203, a top surface 206, a cover right side wall 216, a cover left side wall 218, a right flex gap 208 and a left flex gap 210. The top surface 206 forms substantially a ninety degree angle between both the cover right side wall 216 and the cover left side wall 218, and the top surface 206 extends substantially across the opening 201. The cantilever beam 203 preferably forms an angle of between 160 and 170 degrees with the top surface 206, and the cantilever beam 203 extends substantially across the width of the opening 201, between the right flex gap 208 and the left flex gap 210. The cantilever beam 203 has a projection that extends up substantially toward the rotation edge 202. The end of the projection nearest the rotation edge 202 is a friction edge 204.

Figure 6:
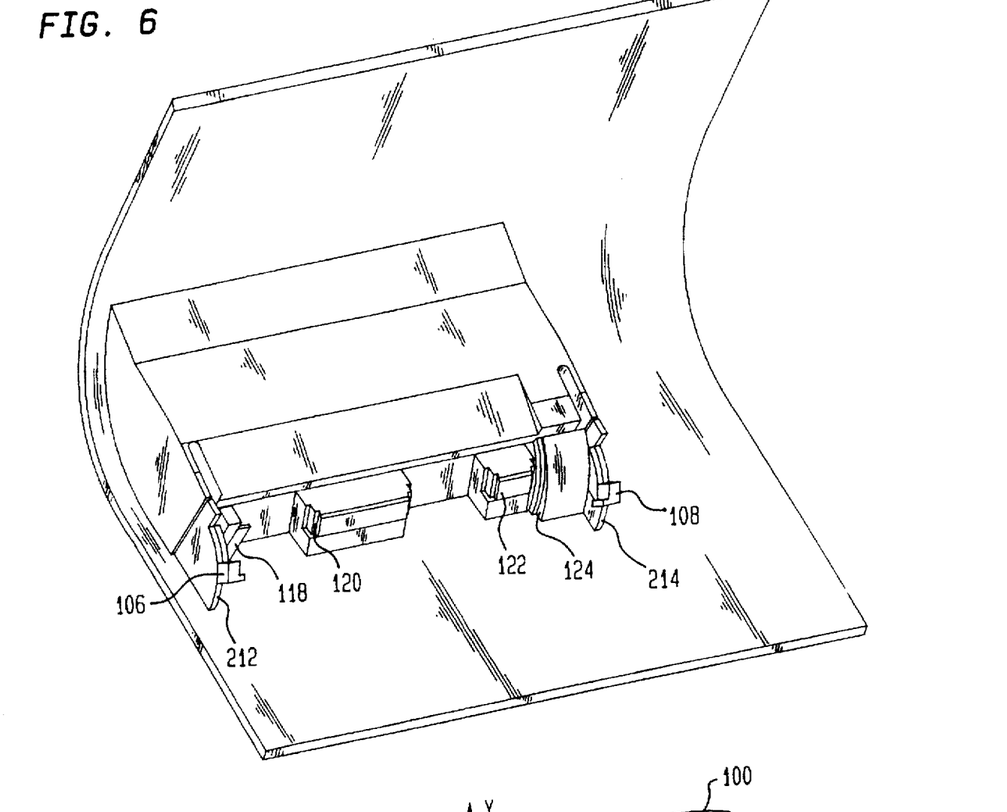
FIG. 6 is a partial perspective view of the display unit of FIG. 1 assembled together with the telephone cover of FIG. 1, as seen from below the telephone cover, illustrating additional connection structures of the preferred embodiment interconnection mechanism.

FIG. 6 is a partial bottom perspective view of the display unit 100 assembled together with the telephone cover 200. FIG. 6 shows a right curved surface 212 and a left curved surface 214, as well as the right snap 106, the left snap 108, the outside right rotation stop 118, the inside right rotation stop 120, the inside left rotation stop 122 and the outside left rotation stop 124. The edges of the curved surfaces 212 and 214 define substantially ninety degree arcs having substantially constant radii.

The preferred embodiment interconnection mechanism of the present invention comprises a plurality of connection structures, including the rotation notch 104, the right snap 106, the right snap hook 107, the left snap 108, the left snap hook 109, the curved friction surface 114, the bottom surface 116, the outside right rotation stop 118, the inside right rotation stop 120, the inside left rotation stop 122, the outside left rotation stop 124, the rotation edge 202, the cantilever beam 203, the friction edge 204, the top surface 206, the right flex gap 208, the left flex gap 210, the right curved surface 212 and the left curved surface 214.

The display unit 100 and the telephone cover 200 are preferably designed so that the display right side wall 126 just fits within the cover right side wall 216, while the display left side wall 128 just fits within the cover left side wall 218. The distance between the outside edge of the right snap hook 107 and the outside edge of the left snap hook 109, on the other hand, is slightly greater than the distance between the cover right side wall 216 and the cover left side wall 218, when the right snap 106 and the left snap 108 are in an uncompressed state. The uncompressed state occurs when the right snap 106 and the left snap 108 are not pressed toward one another. Also, when the right snap 106 and the left snap 108 are in an uncompressed state, the distance between the outside edge of the right snap hook 107 and the outside edge of the left snap hook 109 is slightly greater than the distance between the right curved surface 212 and the left curved surface 214. The right snap 106 and the left snap 108 are preferably flexible, however, so that the snaps 106 and 108 can be pressed toward one another to place the snaps 106 and 108 into a compressed state.

The display unit 100 and the telephone cover 200 are assembled together by first pressing the right snap 106 and the left snap 108 between the cover right side wall 216 and the cover left side wall 218, respectively, with the LCD display 102 facing substantially away from the top surface 206 and with the snaps 106 and 108 facing toward the opening 201. The cover right side wall 216 and the cover left side wall 218 press the snaps 106 and 108 into a compressed state. Next, the entire display unit 100 is slid toward the opening 201 of the telephone cover 200, SO that the rotation notch 104 of the display unit 100 approaches the rotation edge 202 of the telephone cover 200. In the preferred embodiment, the distances between the rotation notch 104 and various points along the curved friction surface 114 are substantially the same, as the curved friction surface 114 defines a substantially constant radius arc about the rotation notch 104. The distance between the rotation notch 104 and the curved friction surface 114 is slightly greater than the distance between the rotation edge 202 and the friction edge 204. As a result, when the display unit 100 is slid into the opening 201, the curved friction surface 114 presses in a downward direction on the friction edge 204. The right flex gap 208 and the left flex gap 210 enable the cantilever beam 203 to flex or bend, increasing the distance between the rotation edge 202 and the friction edge 204 and allowing the display unit 100 to be slid into the opening 201. The flexing of the cantilever beam 203 causes the display unit 100 to be pressed between the friction edge 204 and the rotation edge 202 at the curved friction surface 114 and the rotation notch 104.

The display unit 100 is pushed into the opening 201 of the telephone cover 200 until the right snap hook 107 and the left snap hook 109 extend beyond the right curved surface 212 and the left curved surface 214, respectively. At this point, the right curved surface 212 and the left curved surface 214 are no longer pressing the right snap 106 and the left snap 108 toward one another, so that the right snap 106 and the left snap 108 expand back to the uncompressed state. Thus, the distance between the outside edges of the right snap 106 and the left snap 108 is again greater than the distance between the right curved surface 212 and the left curved surface 214. The display unit 100 is now assembled together with the cover 200, as the display unit 100 is snapped into the telephone cover 200. As shown in FIG. 6, the right snap 106 engages with the right curved surface 212, while the left snap 108 engages with the left curved surface 214, so that the display unit 100 cannot simply be pulled directly back out of the opening 201. Instead, the right snap 106 and the left snap 108 must again be pressed toward one another into a compressed state, before the display unit 100 can be slid back out of the opening 201. Otherwise, the right snap hook 107 would catch on the right curved surface 212 and the left snap hook 109 would catch on the left curved surface 214, preventing the display unit 100 from being slid back out of the opening 201.

Figure 7:
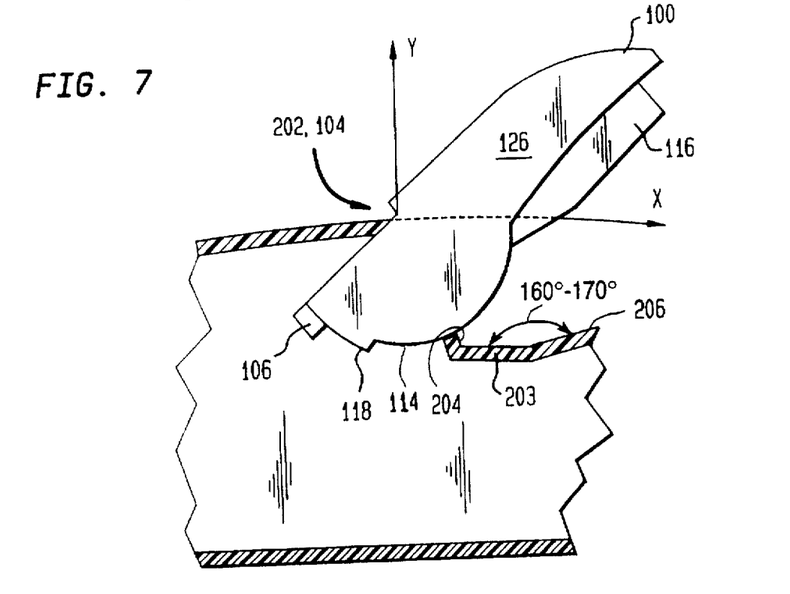
FIG. 7 is a partial cross-sectional view of the display unit of FIG. I assembled together with the telephone cover of FIG. 1, taken along the lines indicated in FIG. 1.

FIG. 7 is a partial cross-sectional view of the display unit 100 assembled together with the telephone cover 200, taken along the lines shown in FIG. 1. Specifically, the cross-sectional view of FIG. 7 is taken from the display right side wall 126, in the direction of the display left side wall 128. With respect to the display unit 100, FIG. 7 shows the right snap 106, the curved friction surface 114, the bottom surface 116, the outside right rotation stop 118 and the display right side wall 126. With respect to the cover 200, FIG. 7 shows the cantilever beam 203, the friction edge 204 and the top surface 206. FIG. 7 also shows the rotation notch 104 of the display unit 100 engaged with the rotation edge 202 of the cover 200.

Preferably, when the display unit 100 and the telephone cover 200 are assembled together, the rotation edge 202 substantially contacts the rotation notch 104, the friction edge 204 substantially contacts the curved friction surface 114, the right snap hook 107 substantially contacts the right curved surface 212 and the left snap hook 109 substantially contacts the left curved surface 214.

FIG. 7 also shows a two dimensional Cartesian coordinate system, in which the positive X axis extends horizontally to the right and the positive Y axis extends vertically in an upward direction. The origin of the two dimensional coordinate system is generally defined as the location at which the rotation edge 202 contacts the rotation notch 104. The following description refers to a three dimensional Cartesian coordinate system, with X and Y axes as illustrated in FIG. 7, and with the positive Z axis extending perpendicularly outward from the paper.

When the display unit 100 is assembled together with the cover 200 using the preferred embodiment interconnection mechanism of the present invention, substantially the only possible movement of the display unit 100 relative to the cover 200 is a rotational movement about the origin of the X-Y plane in FIG. 7. The preferred embodiment interconnection mechanism of the present invention prevents any other movement by providing a general balance of forces between the cover 200 and the display unit 100. The following description relates to the forces between the cover 200 and the display unit 100 when the display unit 100 is assembled together with the cover 200.

The right snap 106 presses against the right curved surface 212 or the display right side wall 126 presses against the cover right side wall 216 to prevent any movement of the display unit 100 relative to the cover 200 in the positive Z direction. Similarly, the left snap 108 presses against the left curved surface 214 or the display left side wall 128 presses against the cover left side wall 218 to prevent any movement of the display unit 100 relative to the cover 200 in the negative Z direction. Other embodiments of the present invention may have gaps between some or all of these surfaces, if movement along the Z axis can be tolerated.

The following discussion relates to forces in the X-Y plane. The rotation edge 202 applies a force against the rotation notch 104, the right curved surface 212 applies a force against the right snap 106, the left curved surface 214 applies a force against the left snap 108 and the friction edge 204 applies a force against the curved friction surface 114. The net effect of these forces is to prevent the display unit 100 from moving in the X-Y plane, relative to the cover 200, except for the rotational movement. Specifically, the forces from the friction edge 204 and the right and left curved surfaces 212 and 214 prevent the display unit 100 from moving in a positive X direction, the force from the rotation edge 202 prevents the display unit 100 from moving in a negative X direction, the forces from the rotation edge 202 and the right and left curved surfaces 212 and 214 prevent the display unit 100 from moving in a positive Y direction, and the force from the friction edge 204 prevents the display unit 100 from moving in a negative Y direction. The vector sum of the forces applied by the rotation edge 202, the right curved surface 212, the left curved surface 214 and the friction edge 204 is zero in both the X direction and the Y direction, so that the combination of these forces maintains the position of the display unit 100 relative to the cover 200.

The force from the friction edge 204 against the curved friction surface 114 is created by the flexing of the cantilever beam 203. As the cantilever beam 203 tends to return to its original shape, the cantilever beam 203 applies a force against the curved friction surface 114, at the friction edge 204. The force applied by the rotation edge 202 against the rotation notch 104, as well as the forces applied by the curved surfaces 212 and 214 against the snaps 106 and 108, are reactions to the force applied by the cantilever beam 203.

The forces described above secure the general position of the display unit 200 relative to the cover 200. However, by design, none of the forces described above apply sufficient angular force to prevent the display unit 100 from rotating about the origin of the X-Y plane. The force applied by the rotation edge 202 at the rotation notch 104 is directed toward and located substantially at the axis of rotation, so that there is only an insignificant amount of friction force in an angular direction. Similarly, the force applied by the friction edge 204 is directed substantially toward the axis of rotation, while the forces applied by the curved surfaces 212 and 214 are directed substantially away from the axis of rotation, so that none of these forces has too strong an angular component. While there is some friction force from the curved surfaces 212 and 214 that is in an angular direction, the surfaces involved with these forces are relatively small, so that the resulting angular forces are also relatively small. Instead, the most significant angular force applied to the display unit 100 derives from the friction edge 204. The friction force applied by the friction edge 204 allows for the continuous adjustability of the display unit 100 relative to the cover 200. The dimensions of the interconnection mechanism are preferably designed so that the total friction force applied to the display unit 100, in an angular direction, is less than two pounds. This force enables the display unit 100 to be easily rotated, while also providing sufficient force to counteract the effect of gravity on the display unit 100.

The preferred embodiment interconnection mechanism of the present invention provides a number of advantages over prior art mechanisms. The preferred embodiment allows the display unit 100 to be physically attached to the telephone 90 by use of the telephone cover 200 alone. In contrast, many prior art mechanisms utilize the cover of a telephone in combination with the base of the telephone, or in combination with other components mounted to the cover. This feature of the preferred embodiment provides important manufacturing advantages. For example, the display unit 100 can be assembled together with the cover 200 without having to simultaneously assemble either the PCB 400 or the base 300, which provides flexibility to the entire manufacturing process.

The preferred embodiment interconnection mechanism also secures the display unit 100 in place with adequate force and precision so that there is substantially no movement of the display unit 100 relative to the cover 200, except for the desired rotational movement, unless the display unit 100 is subjected to extraordinary forces. In addition, the preferred embodiment interconnection mechanism provides a substantially constant friction force against the rotation of the display unit 100, so that the display unit 100 rotates in a smooth manner, without the display unit 100 catching at points during the rotation.

Another advantage of the preferred embodiment interconnection mechanism is that the mechanism allows the display unit 100 to substantially have a minimal thickness between the bottom surface 116 and the top surface, where the LCD display 102 is mounted. In the preferred embodiment, the thickness of the display unit 100 is determined substantially by the thickness of the electronics unit containing the LCD display 102 and associated electronics. In other words, the interconnection mechanism does not add to the thickness that is otherwise required to house the LCD display 102. This is an important feature because it provides a relatively large usable surface area on the PCB 400. In some prior art telephones, the interconnection mechanism causes the tiltable display to extend down into the plane defined by the PCB. In this situation, the PCB must be small enough so that the PCB does not extend into the area of the display unit. In contrast, with the preferred embodiment interconnection mechanism, the display unit 100 is thin enough so that the PCB 400 extends beneath the display unit 100, providing additional surface area for electronic components or circuitry. Finally, the preferred embodiment interconnection mechanism of the present invention does not impose any significant design restrictions on the shape of the display unit 100. Instead, the shape of the display unit 100 can be designed to satisfy other functional or esthetic purposes.

What is claimed is:

1. An interconnection mechanism for connecting a display unit to a telephone in a manner that allows the display unit to rotated continuously relative to the telephone, said interconnection mechanism comprising:

a rotation edge and a rotation notch, a first one of said rotation edge and said rotation notch being in said telephone, a second one of said rotation edge and said rotation notch being in said display unit, said rotation edge engaging with said rotation notch to define an axis of rotation for the display unit, said rotation edge applying a first force against said rotation notch, said rotation notch applying a second force against said rotation edge;

a cantilever beam and a unnotched, curved friction surface, a first one of said cantilever beam and said curved friction surface being in said telephone, a second one of said cantilever beam and said curved friction surface being in said display unit, said cantilever beam applying a third force against said curved friction surface, said curved friction surface applying a fourth force against said cantilever beam; and a snap and a curved surface, a first one of said snap and said curved surface being in said telephone, a second one of said snap and said curved surface being in said display unit, said snap engaging with said curved surface to secure said display unit within said telephone, said snap applying a fifth force against said curved surface, said curved surface applying a sixth force against said snap, wherein said first force, said second force, said third force, said fourth force, said fifth force and said sixth force enable said display unit to be rotated relative to said telephone.

2. The interconnection mechanism of claim 1, wherein said rotation edge is in said telephone and said rotation notch is in said display unit.

3. The interconnection mechanism of claim 1, wherein said cantilever beam is in said telephone and said curved friction surface is in said display unit.

4. The interconnection mechanism of claim 1, wherein said curved surface is in said telephone and said snap is in said display unit.

5. A telephone having an interconnecting mechanism for interconnecting a display unit with a body of said telephone in a manner that allows the display unit to be continously rotated relative to said body, said interconnecting mechanism comprising:

a rotation edge being formed in said telephone body;

a rotation notch being formed in said display unit, said rotation notch engaging with said rotation edge and defining an axis of rotation for said display unit;

a unnotched, curved friction surface being in said display unit;

a cantilever beam being arranged in said telephone body, said cantilever beam applying a force against said curved friction surface and against said rotation edge; and a snap securing said display unit within said telephone body.

6. A telephone in accordance with claim 5, wherein said rotation edge is formed in a top surface of a cover of said telephone body and wherein said rotation notch is formed in an upper surface of said display unit.

7. A telephone in accordance with claim 5, wherein said rotation notch extends substantially across the width of said display unit.

8. A telephone in accordance with claim 5, wherein said rotation notch forms substantially a ninety degree angle.

9. A telephone in accordance with claim 5, wherein said curved friction surface forms a substantially constant radius arc substantially about said rotation notch.

10. A telephone in accordance with claim 5, wherein said curved friction surface extends substantially across the width of said display unit.

11. A telephone in accordance with claim 5, wherein at least one rotation stop is provided which extends away from said curved friction surface and engages in its stop position with said cantilever beam.

12. A telephone in accordance with claim 5, wherein said cantilever beam extends substantially across the width of an opening in a cover of said telephone body.

13. A telephone in accordance with claim 12, wherein said cantilever beam forms an angle of between 160 and 170 degrees with a top surface of said opening in said cover.

14. A telephone in accordance with claim 12 or claim 13, wherein flex gaps are provided on either side of said cantilever beam in said opening for enabling said cantilever beam to bend.

15. A telephone in accordance with claim 5, wherein said cantilever beam has a projection extending substantially toward said rotation edge.

16. A telephone in accordance with claim 15, wherein a surface of the projection nearest to said rotation edge is a friction edge.

17. A telephone in accordance with claim 5, wherein said snap is arranged at either side of said display unit and a second curved surface is arranged at either side of an opening in said telephone body.

18. A telephone in accordance with 17, wherein said second curved surface is in a cover of said telephone body.

19. A telephone in accordance with claim 17, wherein said second curved surface defines a substantially ninety degree arc having a substantially constant radius.

20. A telephone having an interconnecting mechanism rotably connecting a display unit with a body of said telephone, said interconnecting mechanism comprising:

snap means for securing said display unit within said telephone body;

a rotation edge in said telephone body;

a rotation notch in said display unit;

a unnotched, curved friction surface in said display unit;

a cantilever beam in said telephone body, said cantilever beam applying a first force against said curved friction surface, said first force pressing said display unit toward said rotation edge causing said rotation notch to apply a second force against said rotation edge, said rotation edge engaging with said rotation notch to define an axis of rotation around which said display unit can rotate continuously relative to said telephone body.

21. An interconnection mechanism as described in claim 1 wherein said display unit is able to rest stably at any point in the continuous rotation.

22. A telephone as described in claim 5 wherein said display unit is able to rest stably at any point in the continuous rotation.

23. A telephone as described in claim 20 wherein said display unit is able to rest stably at any point in the continuous rotation.

24. An interconnection mechanism as described in claim 1 wherein said continuous rotation is smooth.

* * * * *